US012478343B2

(12) United States Patent
Ishii (10) Patent No.: US 12,478,343 B2
(45) Date of Patent: Nov. 25, 2025

(54) MEDICAL INFORMATION PROCESSING APPARATUS (71) Applicant: CANON MEDICAL SYSTEMS CORPORATION, Otawara (JP)

(72) Inventor: Hideaki Ishii, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 142 days.

(21) Appl. No.: 18/317,146

(22) Filed: May 15, 2023

(65) Prior Publication Data
US 2023/0363731 A1 Nov. 16, 2023

(30) Foreign Application Priority Data

May 16, 2022 (JP) ................. 2022-080138

(51) Int. Cl.
*A61B 6/00* (2024.01)
*A61B 6/46* (2024.01)
(52) U.S. Cl.
CPC ............ *A61B 6/5217* (2013.01); *A61B 6/463* (2013.01); *A61B 6/5205* (2013.01)
(58) Field of Classification Search
CPC ...... A61B 6/5217; A61B 6/463; A61B 6/5205
See application file for complete search history.

(56) References Cited

U.S. PATENT DOCUMENTS

| 5,228,068 A | 7/1993 | Mazess |
| 5,291,537 A | 3/1994 | Mazess |
| 2015/0161786 A1* | 6/2015 | Seifert .............. A61B 6/5211 382/119 |
| 2016/0275678 A1* | 9/2016 | Onal ..................... G06V 10/50 |
| 2017/0319164 A1* | 11/2017 | Tsukagoshi .............. G06T 7/75 |
| 2018/0092615 A1* | 4/2018 | Sakaguchi ............ A61B 5/026 |
| 2020/0098117 A1* | 3/2020 | Kask ..................... G16H 50/50 |
| 2021/0004957 A1* | 1/2021 | Aalamifar ............. G16H 50/30 |
| 2021/0366118 A1* | 11/2021 | Campbell ............. A61B 90/36 |

FOREIGN PATENT DOCUMENTS

JP 6-511184 A 12/1994

OTHER PUBLICATIONS

Bishop, "Pattern Recognition and Machine Learning", Springer, 2006, 68 pages.

* cited by examiner

*Primary Examiner* — Sean A Frith
(74) *Attorney, Agent, or Firm* — Oblon, McClelland, Maier & Neustadt, L.L.P.

(57) ABSTRACT

A medical image processing apparatus of one embodiment includes a processing circuitry. The processing circuitry extracts, from a medical image, anatomical landmarks that represent feature points of anatomical tissue included in the medical image, and calculates, based on a measurement pattern that defines a measurement method for an index that represents a relative positional relationship between a plurality of anatomical landmarks that are measurement targets, an index that represents a relative positional relationship between a plurality of anatomical landmarks corresponding to a condition for the measurement pattern among the extracted anatomical landmarks.

8 Claims, 6 Drawing Sheets

MEDICAL INFORMATION PROCESSING APPARATUS

CROSS-REFERENCE TO RELATED APPLICATIONS

This application is based upon and claims the benefit of priority from Japanese Patent Application No. 2022-080138, filed on May 16, 2022, the entire contents of which are incorporated herein by reference.

FIELD

Embodiments described herein relate generally to a medical information processing apparatus.

BACKGROUND

In the medical practice, a radiologist, such as a radiation specialist, performs radiographic image interpretation with respect to a medical image, but it is said that most of examinations performed by radiographic image interpretation are routine examinations. In the routine examinations, for example, an interval between specific positions in a medical image or the like is measured.

DETAILED DESCRIPTION

A medical information processing apparatus according to one embodiment includes processing circuitry. The processing circuitry extracts, from a medical image, anatomical landmarks that represent feature points of anatomical tissue included in the medical image, and calculates, based on a measurement pattern that defines a measurement method for an index that represents a relative positional relationship between a plurality of anatomical landmarks that are measurement targets, an index that represents a relative positional relationship between a plurality of anatomical landmarks corresponding to a condition for the measurement pattern among the extracted anatomical landmarks.

Embodiments of the medical information processing apparatus will be described in detail below with reference to the drawings.

Figure 1:
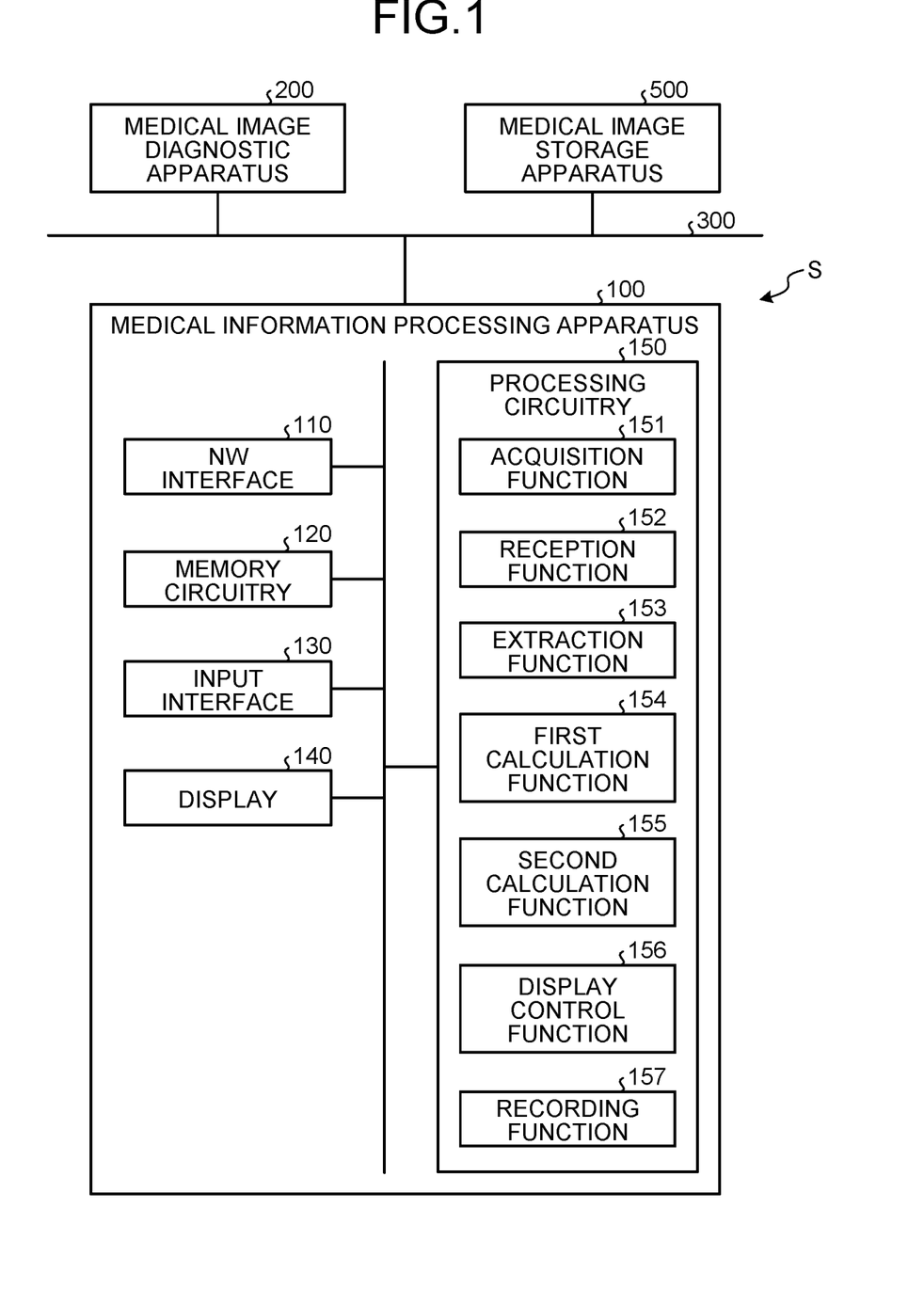
FIG. 1 is a diagram illustrating an example of an overall configuration of a medical information processing system according to a first embodiment.

FIG. 1 is a block diagram illustrating an example of a configuration of a medical information processing system S according to a first embodiment. As illustrated in FIG. 1, the medical information processing system S includes a medical information processing apparatus 100, a medical image diagnostic apparatus 200, and a medical image storage apparatus 500. The medical information processing apparatus 100 is communicably connected to the medical image storage apparatus 500 via a network 300, such as an in-hospital Local Area Network (LAN).

The medical image storage apparatus 500 stores therein a medical image that is captured by the medical image diagnostic apparatus 200. The medical image storage apparatus 500 is a server apparatus of a Picture Archiving and Communication System (PACS) and stores therein medical image data in a certain format that is compliant with Digital Imaging and Communication in Medicine (DICOM). The medical image is, for example, Computed Tomography (CT) image data, magnetic resonance image data, ultrasound diagnostic image data, or the like, but not limited thereto.

The medical image storage apparatus 500 is implemented by, for example, a computer apparatus, such as Database (DB) server, and stores therein medical image data in a semiconductor memory device, such as a Random Access Memory (RAM) or a flash memory, or a memory, such as a hard disk or an optical disk.

The medical image diagnostic apparatus 200 is, for example, an apparatus that captures a medical image of a subject. The medical image diagnostic apparatus 200 is, for example, a Magnetic Resonance Imaging (MRI) apparatus, an X-ray Computed Tomography (CT) apparatus, an X-ray diagnostic apparatus, an ultrasound diagnostic apparatus, a Positron Emission Tomography (PET) apparatus, a Single Photon Emission Computed Tomography (SPECT) apparatus, or the like.

However, the medical image diagnostic apparatus 200 is not limited to the apparatuses as described above. The medical image diagnostic apparatus 200 may also be referred to as a modality. Meanwhile, while the single medical image diagnostic apparatus 200 is illustrated in FIG. 1, it may be possible to arrange the plurality of medical image diagnostic apparatuses 200.

The medical image is an image of a subject captured by the medical image diagnostic apparatus 200. The medical image is, for example, a magnetic resonance image, an X-ray CT image, an ultrasound image, or the like. However, the medical image is not limited to the images as described above.

The medical information processing apparatus 100 is, for example, an information processing apparatus, such as a server apparatus or a Personal Computer (PC). The medical information processing apparatus 100 includes a network (NW) interface 110, memory 120, an input interface 130, a display 140, and processing circuitry 150.

The NW interface 110 is connected to the processing circuitry 150, and controls transmission and communication of various kinds of data between the medical information processing apparatus 100, the medical image diagnostic apparatus 200, and the medical image storage apparatus 500. The NW interface 110 is implemented by a network card, a network adapter, a Network Interface Controller (NIC), or the like.

The memory 120 stores therein various kinds of information used by the processing circuitry 150. For example, the memory 120 stores therein measurement pattern information on a measurement pattern that represents a pattern of measurement in a medical image that is determined in advance, or the like. Further, the memory 120 stores therein various kinds of programs. Meanwhile, the memory 120 is, for example, a storage apparatus, such as a Hard Disk Drive (HDD), a Solid State Drive (SSD), or an integrated circuitry storage apparatus.

Further, the memory 120 may be a driving apparatus that reads and writes various kinds of information between a portable storage medium, such as a Compact Disc (CD), a Digital Versatile Disc (DVD), or a flash memory, and a semiconductor device, such as a Random Access Memory (RAM), or the like.

The input interface 130 is implemented by a trackball that receives operation performed by a user, a switch button, a mouse, a keyboard, a touch pad that performs input operation by touching of an operation surface, a touch screen in which a display screen and a touch pad is integrated, contactless input circuitry using an optical sensor, voice input circuitry, or the like.

The input interface 130 is connected to the processing circuitry 150, converts input operation received from the user to an electrical signal, and outputs the electrical signal to the processing circuitry 150. Meanwhile, in the present specification, the input interface is not limited to those including a physical operating part, such as a mouse or a keyboard. For example, examples of the input interface include electrical signal processing circuitry that receives an electrical signal corresponding to input operation from an external input apparatus that is arranged separately from the subject apparatus and outputs the electrical signal to the processing circuitry 150.

The display 140 displays various kinds of information under the control of the processing circuitry 150. For example, the display 140 outputs a radiogram interpretation viewer including the medical image that is generated by the processing circuitry 150, a Graphical User Interface (GUI) for receiving various kinds of operation from the user, or the like. The display 140 is one example of a display apparatus Specifically, the display 140 is a liquid crystal display, a Cathode Ray Tube (CRT) display, or the like. Meanwhile, the input interface 130 and the display 140 may be integrated with each other. For example, the input interface 130 and the display 140 may be implemented by a touch panel.

The processing circuitry 150 is a processor that implements a function corresponding to each of programs by reading the programs from the memory 120 and executing the programs. The processing circuitry 150 of the present embodiment includes an acquisition function 151, a reception function 152, an extraction function 153, a first calculation function 154, a second calculation function 155, a display control function 156, and a recording function 157.

Here, for example, each of processing functions of the acquisition function 151, the reception function 152, the extraction function 153, the first calculation function 154, the second calculation function 155, the display control function 156, and the recording function 157 that are constituent elements of the processing circuitry 150 is stored in the memory 120 in the form of a computer-executable program. The processing circuitry 150 is a processor. For example, the processing circuitry 150 implements a function corresponding to each of programs by reading the programs from the memory 120 and executing the programs.

In other words, the processing circuitry 150 that has read each of the programs has each of the functions illustrated in the processing circuitry 150 in FIG. 1. Meanwhile, in FIG. 1, it is explained that a single processor implements the processing functions executed by the acquisition function 151, the reception function 152, the extraction function 153, the first calculation function 154, the second calculation function 155, the display control function 156, and the recording function 157, but the processing circuitry 150 may be configured as a combination of a plurality of independent processors and implement the functions by causing each of the processors to execute the program.

Further, in FIG. 1, it is explained that the single memory 120 stores therein the program corresponding to each of the processing functions, but it may be possible to arrange a plurality of memory circuitry in a distributed manner and cause the processing circuitry 150 to read the corresponding program from the individual memory.

In the explanation described above, the example has been explained in which the "processor" reads the program corresponding to each of the functions from the memory circuitry and executes the read program, but embodiments are not limited to this example. The term "processor" indicates, for example, a Central Processing Unit (CPU), a Graphics Processing Unit (GPU), an Application Specific Integrated Circuit (ASIC), a programmable logic device (for example, a Simple Programmable Logic Device (SPLD)), a Complex Programmable Logic Device (CPLD), and a Field Programmable Gate Array (FPGA)).

If the processor is, for example, a CPU, the processor implements the functions by reading programs stored in the memory circuitry and executing the programs. In contrast, if the processor is an ASIC, the programs are not stored in the memory 120, but the functions are directly incorporated, as logical circuitry, in circuitry of the processor. Meanwhile, each of the processors of the present embodiment need not always be configured as single circuitry for each of the processors, but it may be possible to construct a single processor by combining a plurality of independent circuitry and implement corresponding functions. Further, it may be possible to integrate the plurality of constituent elements illustrated in FIG. 1 into a single processor and implement corresponding functions.

The acquisition function 151 acquires a medical image in which a subject is captured from the medical image storage apparatus 500 via the network 300 and the NW interface 110. Meanwhile, the acquisition function 151 may acquire the medical image from the medical image diagnostic apparatus 200.

For example, the acquisition function 151 acquires medical image data corresponding to a patient ID of a subject to be diagnosed from the medical image storage apparatus 500.

The reception function 152 receives a selection of a measurement pattern to be executed from among a plurality of measurement patterns. The measurement pattern is, for example, "an interval between a 00 part and a AA part and an interval between the AA part and a III part in a medical image are measured". The measurement pattern is stored, as measurement pattern information, in the memory 120 or the like. The measurement pattern information is information in which, for example, a measurement pattern name, a measurement target, a plurality of anatomical landmarks corresponding to a measurement part, and a measurement index are associated with one another.

As one example, in the measurement pattern information, information in which a "measurement pattern name: a thoracic vertebra measurement pattern X" and "measurement targets: a third lumbar vertebra T3, a fourth lumbar vertebra T4, a fifth lumbar vertebra T5, and a sixth lumbar vertebra T6", "anatomical landmarks: a feature point T3, a feature point T4, a feature point T5, and a feature point T6", and "measurement indices: a direct distance between the feature point T3 and the feature point T4, a direct distance between the feature point T4 and the feature point T5, and a direct distance between the feature point T5 and the feature point T6" are associated with one another is registered.

Here, the measurement index is one example of a measurement method. Meanwhile, the measurement pattern information may be determined in advance or may be determined arbitrarily by a user, such as a radiologist.

For example, the reception function 152 receives input of a selection of a measurement pattern from the user via the input interface 130. In this case, the display 140 displays, for example, a list of a plurality of measurement pattern names as a GUI that receives input of a selection of the measurement pattern from the user.

The extraction function 153 extracts an anatomical landmark that represents a local feature point included in anatomical tissue from medical image data IG that is acquired by the acquisition function 151. For example, the extraction function 153 extracts the anatomical landmark based on anatomical information.

The anatomical information is, for example, information on a position of a feature point related to anatomical tissue, such as a bone and an organ. The anatomical information may also be referred to as anatomical landmark information. The anatomical landmark is, for example, a local feature point that is included in the anatomical tissue, such as a "lower end of a kidney" or "tips of first to twelfth ribs".

As a method of extracting the anatomical landmark, a well-known image processing technique is applicable. For example, the extraction function 153 inputs a medical image to a landmark extraction model (one example of the anatomical information), and extracts an anatomical landmark based on an output result.

The landmark extraction model is, for example, a trained model that outputs coordinate information on an anatomical landmark and identification information on the anatomical landmark (hereinafter, also referred to as a label) upon input of the medical image. For example, the landmark extraction model is generated by an external training apparatus. Meanwhile, the medical information processing apparatus 100 may generate the landmark extraction model.

Further, in the present embodiment, it is assumed that the landmark extraction model is stored in a storage apparatus that is included in an external workstation or the like; however, the landmark extraction model may be stored in the memory 120.

Figure 2:
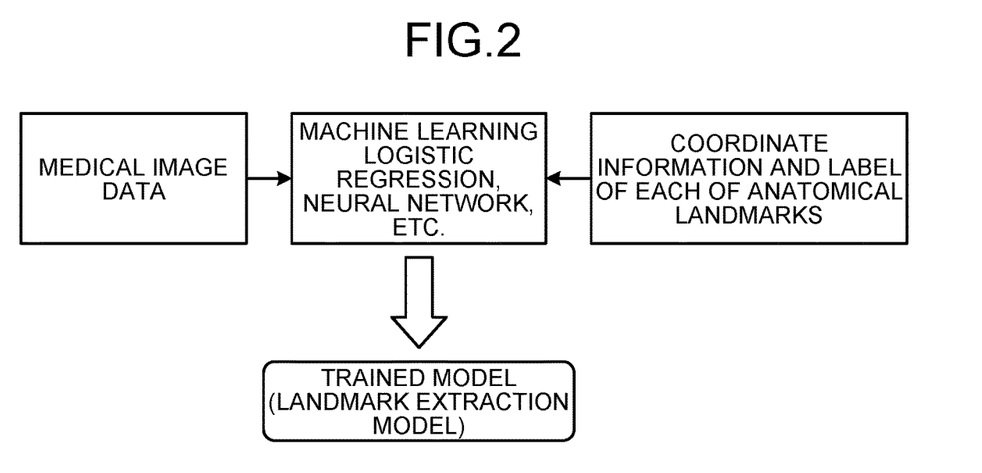
FIG. 2 is an explanatory diagram illustrating an example of a method of generating a landmark extraction model by machine learning according to one embodiment.

A method of generating the landmark extraction model will be described below. For example, the training apparatus generates a landmark model by performing machine learning (including deep learning). FIG. 2 is an explanatory diagram illustrating an example of the method of generating the landmark extraction model by machine learning.

For example, as illustrated in FIG. 2, the training apparatus inputs "medical image data" that is input-side teacher data and "coordinate information and a label of each of anatomical landmarks in the medical image" that is output-side teacher data as a training data set to a machine learning engine and performs machine learning, so that a landmark extraction model (trained model) is generated that is functioned to output the coordinate information and the label of each of the anatomical landmarks in the medical image in accordance with input of the medical image data.

Here, as the machine learning engine, for example, a neural network described in well-known Non-Patent Literature "Christopher M. Bishop, "Pattern recognition and machine learning", (United States of America), First Edition, Springer, 2006, P. 225-290" or the like may be applicable.

Meanwhile, as for the machine learning engine, it may be possible to apply, for example, various kinds of algorithms, such as deep learning, logistic regression analysis, non-linear discriminant analysis, Support Vector Machine (SVM), Random Forest, or Naive Bayes, in addition to the neural network as described above.

Figure 3:
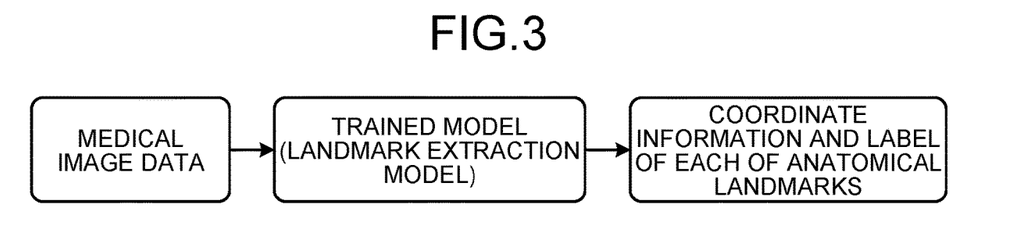
FIG. 3 is a diagram for explaining an example of a method of extracting anatomical landmarks by using a trained model according to one embodiment.

FIG. 3 is a diagram for explaining an example of a method of extracting anatomical landmarks by using a trained model. For example, as illustrated in FIG. 3, the extraction function 153 inputs the medical image data that is acquired by the acquisition function 151 to the landmark extraction model (trained model). Then, the extraction function 153 extracts an anatomical landmark based on the coordinate information and the label of the anatomical landmark that is present in the input medical image data, where the coordinate information and the label are output from the landmark extraction model.

Figure 4:
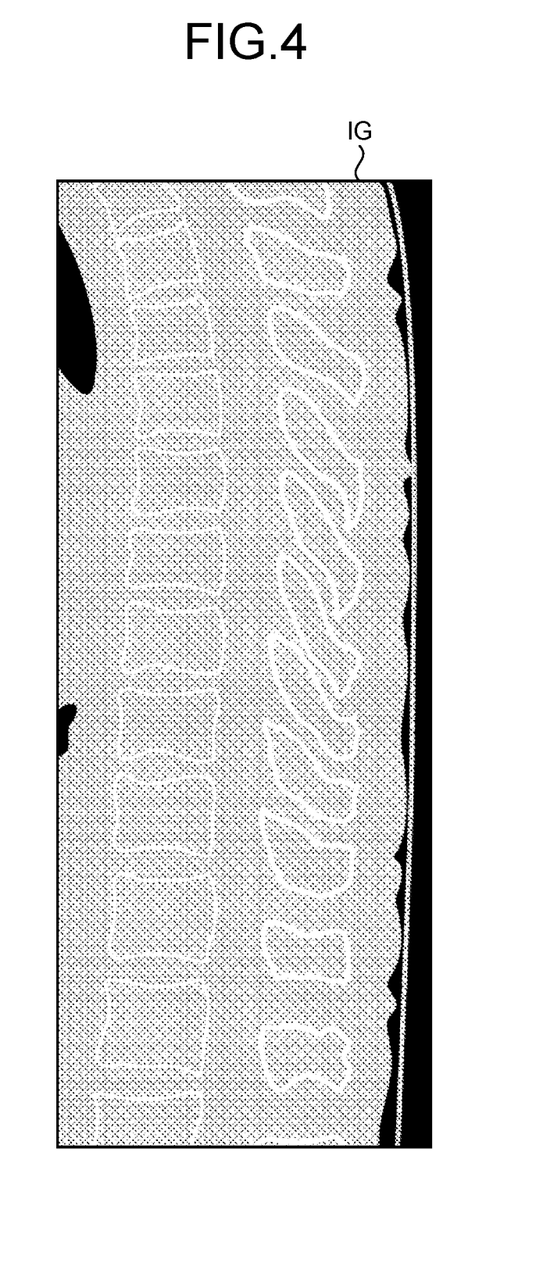
FIG. 4 illustrates an example of CT image data in which a spine of a subject is captured according to one embodiment.

A process performed by the extraction function 153 will be described below by using an example in which CT image data in which thoracic vertebrae (a third thoracic vertebra T3 to a sixth thoracic vertebra T6) are captured is input, as the medical image data, to the landmark extraction model. FIG. 4 illustrates an example of the CT image data in which a spine of a subject is captured. The extraction function 153 inputs CT image data IG to the landmark extraction model that is stored in a storage apparatus of an external workstation via the NW interface 110.

The landmark extraction model outputs, in response to the input of the CT image data IG, pieces of coordinate information on a feature point T3 to a feature point T6, which correspond to the third thoracic vertebra to the sixth thoracic vertebra that are a plurality of anatomical landmarks present in the CT image data IG, and T3 to T6 that represent the third thoracic vertebra to the sixth thoracic vertebra, in an associated manner.

For example, the landmark extraction model outputs labels for identifying the feature points (anatomical landmarks), such as "T3(x3, y3, z3), T4 (x4, y4, z4), ... T6(x6, y6, z6)" (see FIG. 5), and text data that represents coordinates of the feature points. Meanwhile, the coordinate information and the label may be output as data in a certain format that is recordable as supplementary information of DICOM.

The extraction function 153 acquires, via the NW interface 110, the coordinate information and the label of the anatomical landmark that corresponds to the received measurement pattern from among the pieces of coordinate information and the labels of the anatomical landmarks that are output from the landmark extraction model.

For example, if the reception function 152 receives input of a selection of the "thoracic vertebra measurement pattern X" that is described as one example, the extraction function 153 refers to the measurement pattern information that is stored in the memory 120, and identifies "the feature point T3, the feature point T4, the feature point T5, and the feature point T6" that are a plurality of anatomical landmarks corresponding to "the thoracic vertebra measurement pattern X".

Further, the extraction function 153 acquires the pieces of coordinate information on the feature point T3, the feature point T4, the feature point T5, and the feature point T6 and the labels corresponding to the features points. The extraction function 153 extracts the anatomical landmarks by plotting the anatomical landmarks at positions corresponding to the pieces of coordinate information on the medical image data IG on the basis of the pieces of acquired coordinate information and adding the labels associated with the anatomical landmarks.

Figure 5:
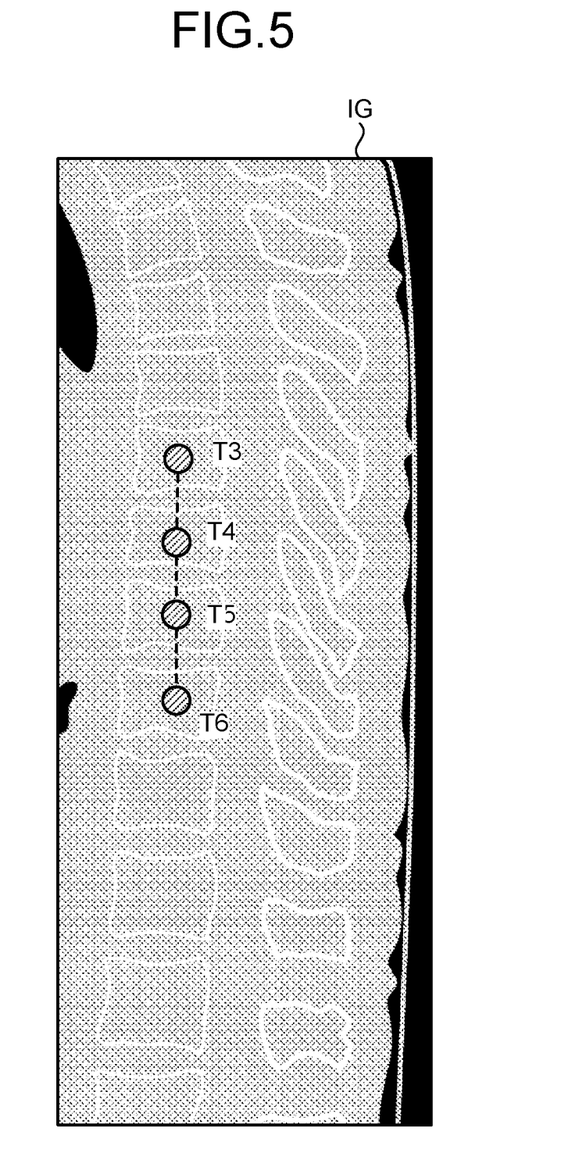
FIG. 5 is a diagram for explaining an example of a process of extracting positions of the anatomical landmarks according to one embodiment.

FIG. 5 is a diagram illustrating an example of an extraction result of the anatomical landmarks. As illustrated in FIG. 5, the extraction function 153 extracts the features points T3 to T6 on the medical image data IG related to the received measurement pattern, while adding the labels for identifying the respective feature points.

Meanwhile, in the present embodiment, the extraction function 153 extracts the anatomical landmarks corresponding to the selected measurement pattern in accordance with input of a selection of the measurement pattern received by the reception function 152, but the extraction function 153 may extract all of anatomical landmarks that are present on the medical image data IG before the reception function 152 receives the measurement pattern.

The first calculation function 154 calculates, as a measurement result, an index that represents a relative positional relationship between the anatomical landmarks corresponding to a condition for the measurement pattern among the anatomical landmarks that are extracted by the extraction function 153, on the basis of the measurement pattern to be executed.

For example, if the reception function 152 receives "the thoracic vertebra measurement pattern X", the first calculation function 154 refers to the measurement pattern information that is stored in the memory 120, and identifies "the direct distance between the feature point T3 and the feature point T4, the direct distance between the feature point T4 and the feature point T5, and the direct distance between the feature point T5 and the feature point T6" that are measurement indices corresponding to "the thoracic vertebra measurement pattern X".

Further, the first calculation function 154 calculates the direct distance between the feature point T3 and the feature point T4, the direct distance between the feature point T4 and the feature point T5, and the direct distance between the feature point T5 and the feature point T6, by using the pieces of coordinate information on the feature point T3, the feature point T4, the feature point T5, and the feature point T6 that are acquired by the extraction function 153.

Figure 6:
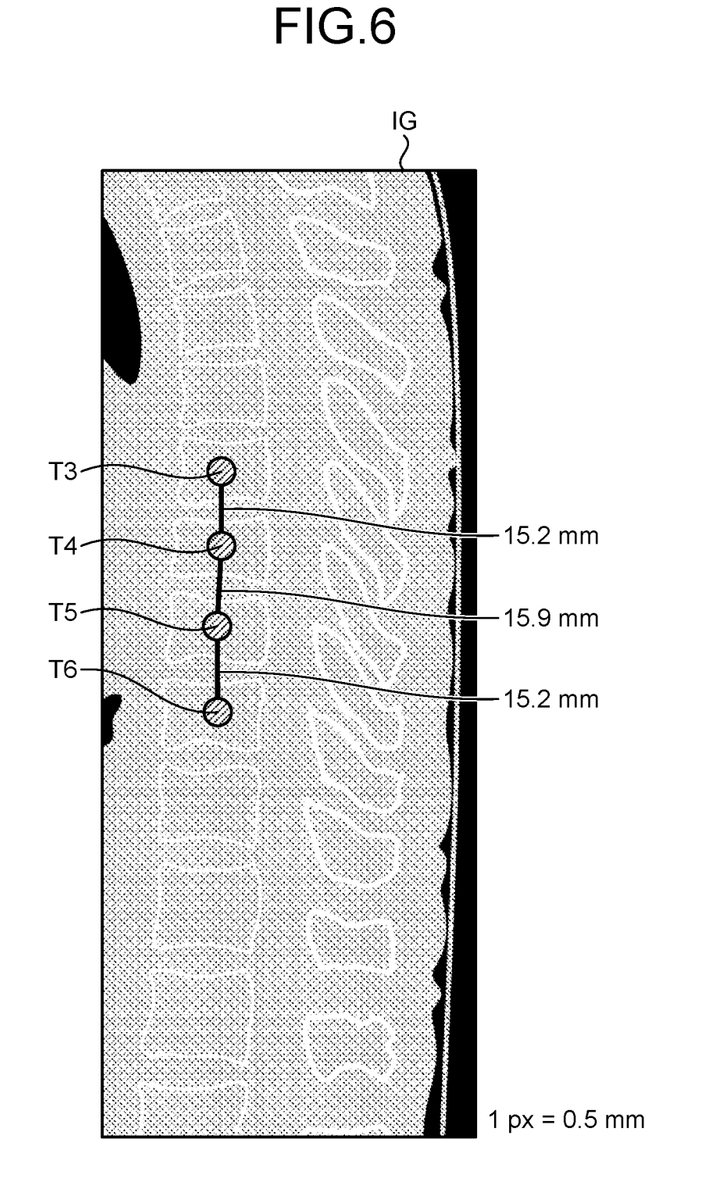
FIG. 6 is a diagram for explaining an example of a process of calculating indices that represent relative positional relationships between the anatomical landmarks according to one embodiment.

A process of calculating (measuring) a distance between the anatomical landmarks will be described below with reference to FIG. 6. FIG. 6 is a diagram illustrating an example of the process of calculating a distance between the anatomical landmarks. For example, if the direct distance between the feature point T3 and the feature point T4 is to be calculated, the first calculation function 154 calculates a distance between the coordinates (x3, y3, z3) of the feature point T3 and the coordinates (x4, y4, z4) of the feature point T4 in pixels (px).

Subsequently, the first calculation function 154 converts the distance in pixels to a length (millimeters (mm)) based on a distance of one pixel. For example, if the distance in pixel between the feature point T3 and the feature point T4 is 30.4 (px) and a length of one pixel is 0.5 (mm), the first calculation function 154 calculates an interval (length) from the third thoracic vertebra T3 to the fourth thoracic vertebra T4 such that 30.4×0.5=15.2 (mm).

Referring back to FIG. 1, explanation will be continued. The second calculation function 155 calculates a differential value between a past measurement result and the measurement result calculated by the first calculation function 154. Specifically, first, the second calculation function 155 refers to information that is recorded in DICOM of the medical image IG that is acquired by the acquisition function 151, and checks whether a measurement result obtained in the past (hereinafter, also referred to as a past measurement result) with respect to the index corresponding to the measurement pattern received by the reception function 152 is recorded.

If the past measurement result is recorded, the second calculation function 155 reads the past measurement result that is recorded as the supplementary information in DICOM. Subsequently, the second calculation function 155 calculates a differential value between the read past measurement result and the measurement result that is calculated by the first calculation function 154. Here, the second calculation function 155 calculates a differential value for the "measurement index" that is registered as a "differential value measurement target" in the measurement pattern information.

For example, in the example illustrated in FIG. 6, if "the measurement indices: the direct distance between the feature point T3 and the feature point T4, the direct distance between the feature point T4 and the feature point T5, and the direct distance between the feature point T5 and the feature point T6" are registered, in association with different kinds of information, in the measurement pattern information, the second calculation function 155 calculates a differential value for each of the interval between the third thoracic vertebra T3 and the fourth thoracic vertebra T4, the interval between the fourth thoracic vertebra T4 and the fifth thoracic vertebra T5, and the interval between the fifth thoracic vertebra T5 and the sixth thoracic vertebra T6.

Further, for example, in the example illustrated in FIG. 6, if the past measurement result of the interval between the third thoracic vertebra T3 and the fourth thoracic vertebra T4 is 15.0 (mm), the second calculation function 155 calculates a differential value of the measurement result of the interval between the third thoracic vertebra T3 and the fourth thoracic vertebra T4 such that 15.0 (mm)−15.2 (mm)=−0.2 (mm). Furthermore, if the past measurement result of the interval between the fourth thoracic vertebra T4 and the fifth thoracic vertebra T5 is 16.0 (mm), the second calculation function 155 calculates a differential value of the measurement result of the interval between the fourth thoracic vertebra T4 and the fifth thoracic vertebra T5 such that 16.0 (mm)−15.9 (mm)=0.1 (mm). Moreover, if the past measurement result of the interval between the fifth thoracic vertebra T5 and the sixth thoracic vertebra T6 is 15.4 (mm), the second calculation function 155 calculates a differential value of the measurement result of the interval between the fifth thoracic vertebra T5 and the sixth thoracic vertebra T6 such that 15.4 (mm)−15.2 (mm)=0.2 (mm).

The display control function 156 causes the display 140 to display various kinds of information. For example, the display control function 156 causes the display 140 to display the measurement result that is calculated by the first calculation function 154. As the measurement result, it may be possible to display only a numerical value on the display 140 or both of the numerical value and the medical image on the display 140 as illustrated in FIG. 6.

Furthermore, for example, if the second calculation function 155 has calculated the differential value, the display control function 156 causes the display 140 to display a past measurement date and time, the past measurement result, and the differential value, in addition to the measurement result that is calculated by the first calculation function 154. Meanwhile, if an older past measurement result is present, the display control function 156 may cause the display 140 to display a plurality of past measurement results.

Moreover, for example, if the differential value that is calculated by the second calculation function 155 exceeds a threshold that is determined in advance, the display control function 156 may display the past measurement result and the differential value in an emphasized manner, such as display in red or display in bold.

The recording function 157 records the measurement result that is calculated by the first calculation function 154 as the supplementary information of the medical image. For example, the recording function 157 records the measurement result as the supplementary information of DICOM of the medical image data IG. Furthermore, for example, the recording function 157 transmits the medical image data IG for which the measurement result is recorded as the supplementary information of DICOM to the medical image storage apparatus 500 or the like.

Figure 7:
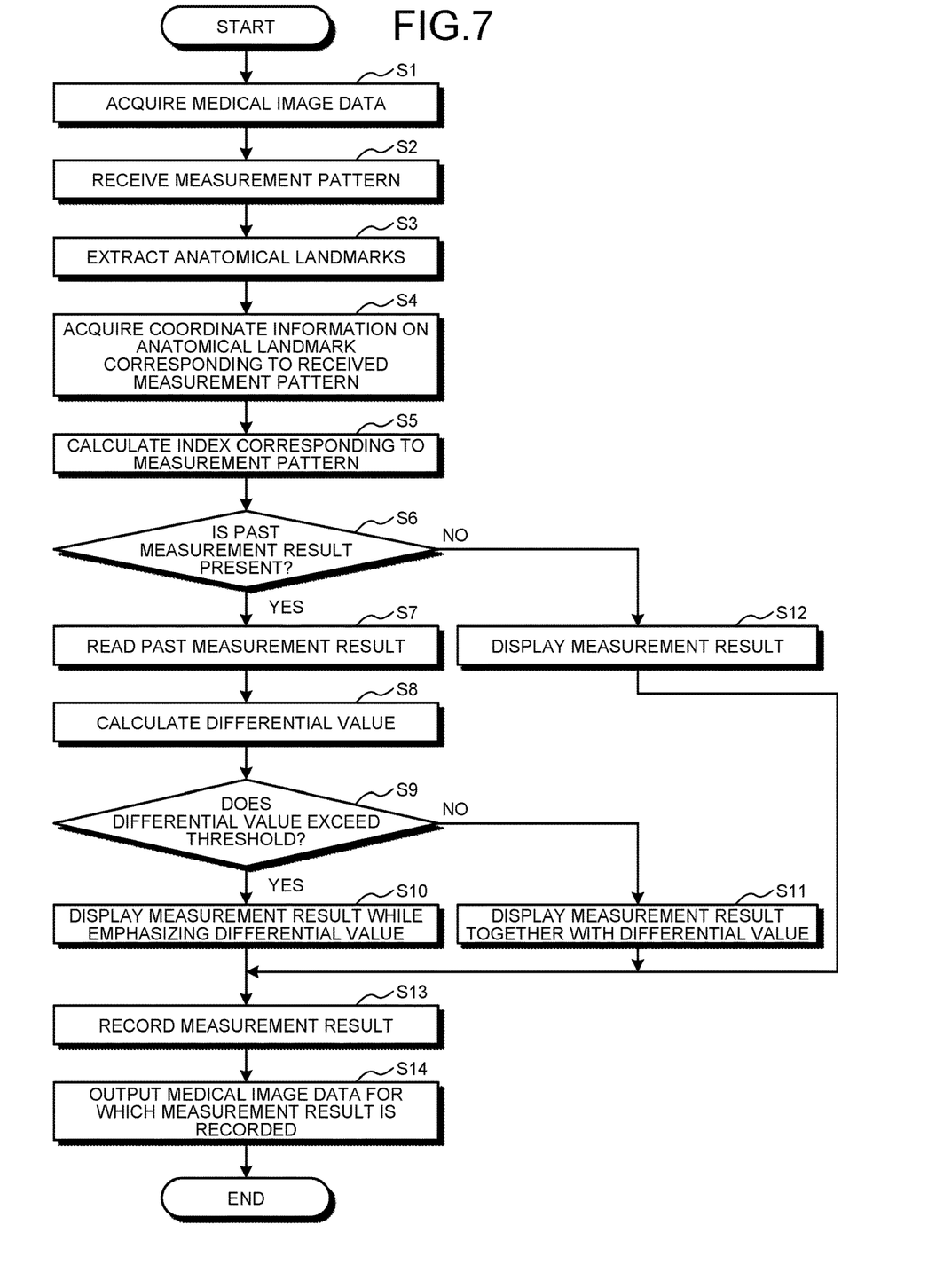
FIG. 7 is a flowchart illustrating an example of a process performed by the medical information processing apparatus according to one embodiment.

A process performed by the medical information processing apparatus 100 configured as described above will be described below. FIG. 7 is a flowchart illustrating an example of the process performed by the medical information processing apparatus 100.

First, the acquisition function 151 acquires the medical image data IG of a subject to be diagnosed (Step S1). Specifically, the acquisition function 151 acquires the medical image data IG corresponding to a patient ID of the subject to be diagnosed from the medical image storage apparatus 500.

Subsequently, the reception function 152 receives input of a selection of the measurement pattern from the user (Step S2). Specifically, the reception function 152 receives input of a selection of the measurement pattern from the user via the input interface 130.

Then, the extraction function 153 extracts a plurality of anatomical landmarks from the acquired medical image data IG (Step S3). Specifically, the extraction function 153 inputs the medical image data IG to the landmark extraction model.

Subsequently, the extraction function 153 acquires the coordinate information on an anatomical landmark corresponding to the received measurement pattern (Step S4). Specifically, the extraction function 153 refers to the measurement pattern information that is stored in the memory 120, and acquires the coordinate information on the anatomical landmark corresponding to the received measurement pattern among the anatomical landmarks output from the landmark extraction model.

Then, the first calculation function 154 calculates an index corresponding to the received measurement pattern (Step S5). Specifically, the first calculation function 154 refers to the measurement pattern information that is stored in the memory 120, and identifies the measurement index corresponding to the received measurement pattern. The first calculation function 154 calculates the identified measurement index based on the coordinate information on the anatomical landmark acquired by the extraction function 153.

Subsequently, the second calculation function 155 checks whether the past measurement result corresponding to the received measurement pattern is present (Step S6). Specifically, the second calculation function 155 refers to the information that is recorded in DICOM of the medical image data IG acquired by the acquisition function 151, and checks whether the past measurement result corresponding to the received measurement pattern is recorded as the supplementary information.

If the past measurement result is not present (Step S6: No), the display control function 156 causes the display 140 to display the measurement result that is calculated by the first calculation function 154 (Step S12). Thereafter, the process goes to Step S13. In contrast, if the past measurement result is present (Step S6: Yes), the second calculation function 155 reads the past measurement result that is recorded as the supplementary information in DICOM (Step S7).

Subsequently, the second calculation function 155 calculates a differential value between the read past measurement result and the measurement result that is calculated by the first calculation function 154 (Step S8). Then, the display control function 156 checks whether the differential value calculated by the second calculation function 155 exceeds a threshold that is determined in advance (Step S9).

If the differential value does not exceed the threshold (Step S9: No), the display control function 156 displays the differential value and the measurement result that is calculated by the first calculation function 154 (Step S11). Specifically, the display control function 156 causes the display 140 to display the past measurement date and time, the past measurement result, the differential value, and the current measurement result. Thereafter, the process goes to Step S13.

In contrast, if the differential value exceeds the threshold (Step S9: Yes), the display control function 156 displays the differential value in an emphasized manner, together with the measurement result that is calculated by the first calculation function 154 (Step S10). Specifically, the display control function 156 causes the display 140 to display the past measurement date and time, the past measurement result, and the differential value in an emphasized manner, such as display in red or display in bold, together with the current measurement result.

Subsequently, the recording function 157 records the measurement result that is calculated by the first calculation function 154 in the medical image data IG (Step S13). Specifically, the recording function 157 records the measurement result as the supplementary information of DICOM of the medical image data IG.

Then, the recording function 157 outputs the medical image data IG for which the measurement result is recorded (Step S14). Specifically, the recording function 157 transmits the medical image data IG to the medical image storage apparatus 500 or the like via the NW interface 110, and terminates the process.

As described above, the medical information processing apparatus 100 according to the present embodiment receives input of the measurement pattern from the user, extracts a plurality of anatomical landmarks from the medical image data IG, and acquires the coordinate information on an anatomical landmark corresponding to the received measurement pattern. Further, the medical information processing apparatus 100 calculates, as the measurement result, an index that represents a relationship between the anatomical landmarks corresponding to the measurement pattern on the basis of the received measurement pattern and the acquired coordinate information.

With this configuration, it is possible to acquire the coordinate information on the anatomical landmark corresponding to the received measurement pattern and calculate the index corresponding to the measurement pattern, so that a user is able to perform desired measurement on the medical image by only selecting the measurement pattern. In other words, according to the medical information processing apparatus 100 of the present embodiment, it is possible to improve operation efficiency of the measurement process among the anatomical landmarks on a medical image.

Furthermore, the past measurement result is stored in the supplementary information of DICOM of the medical image data IG according to the present embodiment. Moreover, the medical information processing apparatus 100 is able to obtain a differential value from the past measurement result and the calculated measurement result. Therefore, a user, such as a radiologist, is able to compare the previous measurement result and the current measurement result without performing manual operation for position alignment or the like on medical images. In other words, according to the medical information processing apparatus 100 of the present embodiment, it is possible to improve operation efficiency of the measurement process among the anatomical landmarks on a medical image.

Furthermore, if the differential value between the previous measurement result and the current measurement result exceeds a threshold that is determined in advance, the medical information processing apparatus 100 according to the present embodiment displays the differential value in an emphasized manner. With this configuration, if the measurement result largely varies from the previous measurement, the user is able to easily recognize the situation.

Moreover, the medical information processing apparatus 100 according to the present embodiment records the current measurement result as the supplementary information of DICOM of the medical image data IG, and outputs the current measurement result to the medical image storage apparatus 500 or the like. With this configuration, it is possible to store past measurement results in the medical image data IG, and use the past measurement results for calculation of a differential value at similar measurement next or later time.

Meanwhile, the embodiment as described above may be appropriately modified by changing a part of the configuration or the functions of each of the apparatuses. Therefore, in the following, some modifications of the embodiment as described above will be described as other embodiments. Meanwhile, in the following, differences from the embodiment as described above will be mainly explained, and detailed explanation of the common details as described above will be omitted. Furthermore, the modifications described below may be implemented individually or by being combined appropriately.

First Modification

In the embodiment as described above, the mode has been described in which the medical information processing apparatus 100 performs the process of extracting the anatomical landmarks. However, the apparatus that performs the process of extracting the anatomical landmarks is not limited to the medical information processing apparatus 100. For example, the medical image diagnostic apparatus 200 may perform the process of extracting the anatomical landmarks.

If the medical image diagnostic apparatus 200 is an X-ray CT apparatus, for example, processing circuitry of a console apparatus included in the X-ray CT apparatus performs the process of extracting the anatomical landmarks. In this case, the processing circuitry inputs CT image data that is captured or reconstructed by the X-ray CT apparatus to the landmark extraction model that is stored in an external work station or the like. Then, the processing circuitry acquires the coordinate information and the label of each of anatomical landmarks output from the landmark extraction model.

Furthermore, the processing circuitry performs a process of recording the acquired coordinate information and the acquired label of each of the anatomical landmarks as supplementary information of DICOM of the CT image data. The processing circuitry transmits the CT image data for which the coordinate information and the label of each of the anatomical landmarks is recorded as the supplementary information of DICOM to the medical image storage apparatus 500.

Meanwhile, the processing circuitry may generate text data that represents information on the acquired coordinate information and the label of each of the anatomical landmarks. In this case, the processing circuitry transmits the text data together with the CT image data to the medical image storage apparatus 500.

In the present modification, the acquisition function 151 of the medical information processing apparatus 100 is able to acquire the CT image data (medical image data) for which the coordinate information and the label of the anatomical landmark is recorded as the supplementary information of DICOM.

Therefore, the medical information processing apparatus 100 according to the present modification is able to acquire the coordinate information on the anatomical landmark corresponding to the received measurement pattern without communicating with an external work station or the like that stores therein the landmark extraction model. In other words, according to the present modification, it is possible to reduce a processing load on the medical information processing apparatus 100 and efficiently perform the measurement process among the anatomical landmarks on the medical image.

Second Modification

In the embodiment as described above, the mode has been described in which the first calculation function 154 calculates, as the measurement result, a distance (length) between two points as the index that represents the relative positional relationship between the anatomical landmarks corresponding to the condition for the measurement pattern. However, the index that is calculated by the first calculation function 154 is not limited to the distance. For example, the first calculation function 154 may calculate, as the measurement result, an angle formed by specific three anatomical landmarks.

According to the medical information processing apparatus 100 of the present modification, it is possible to efficiently calculate an index other than the distance.

Third Modification

In the embodiment as described above, the mode has been described in which the first calculation function 154 calculates the index related to positions of the anatomical landmarks in accordance with input of a selection of the measurement pattern that the reception function 152 has received from the user. However, the first calculation function 154 may identify the measurement pattern to be executed on the basis of the plurality of extracted anatomical landmarks, and calculate the index in accordance with the identified measurement pattern.

In the present modification, after the acquisition function 151 acquires the medical image data IG, the extraction function 153 extracts all of anatomical landmarks that are present on the medical image data IG acquired by the acquisition function 151. The first calculation function 154 refers to the measurement pattern information that is stored in the memory 120, and identifies the measurement pattern corresponding to a combination of the plurality of anatomical landmarks extracted by the extraction function 153.

For example, a case will be described, as one example, in which information in which "the measurement pattern name: the thoracic vertebra the measurement pattern X", the "measurement targets: the third lumbar vertebra T3, the fourth lumbar vertebra T4, the fifth lumbar vertebra T5, and the sixth lumbar vertebra T6", the "anatomical landmarks: the feature point T3, the feature point T4, the feature point T5, and the feature point T6", and the "measurement indices: the direct distance between the feature point T3 and the feature point T4, the direct distance between the feature point T4 and the feature point T5, and the direct distance between the feature point T5 and the feature point T6" are associated with one another is registered in the measurement pattern information, and the extraction function 153 extracts the "anatomical landmarks: the feature point T1 to the feature point T9" will be described.

In this case, the "anatomical landmarks: the feature point T3, the feature point T4, the feature point T5, and the feature point T6" are included in the plurality of anatomical landmarks extracted by the extraction function 153, so that the first calculation function 154 identifies the "thoracic vertebra measurement pattern X" as the measurement pattern to be executed. Here, the first calculation function 154 according to the present modification is one example of an identification unit.

Meanwhile, if a plurality of measurement patterns are identified, the first calculation function 154 may calculate indices for all of the identified measurement patterns or calculate a predetermined number of indices (for example, three indices in order from the highest to lowest priority) in accordance with the priority.

According to the present modification, it is possible to identify the measurement pattern to be executed in accordance with an anatomical landmark extraction result obtained by the extraction function 153, so that it is possible to calculate the measurement result without receiving input of a selection from a user. In other words, it is possible to more efficiently perform the measurement process among the anatomical landmarks on the medical image.

According to at least one of the embodiments as described above, it is possible to improve operation efficiency of the measurement process among the anatomical landmarks on the medical image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical information processing apparatus comprising:
processing circuitry that
receives an input of a medical image,
receives a selection of a measurement pattern name corresponding to a measurement pattern to be executed from among a plurality of measurement pattern names representing a plurality of predetermined measurement patterns for the medical image,
identifies two or more anatomical landmarks and a measurement index based on the selected measurement pattern name and measurement pattern information, wherein the measurement pattern information includes, for each of the plurality of measurement pattern names, two or more anatomical landmarks and a measurement index associated with each other, each of the two or more anatomical landmarks represents a feature point of anatomical tissue, and the measurement index represents at least one of a distance between at least two of the two or more anatomical landmarks or an angle that is formed by at least three of the two or more anatomical landmarks,
extracts, from the medical image, the identified two or more anatomical landmarks,
acquires coordinate information of the extracted anatomical landmarks,
calculates the identified measurement index based on the acquired coordinate information, and
displays the calculated measurement index on a display as a numerical value.

2. The medical information processing apparatus according to claim 1, wherein the processing circuitry receives the selection of the measurement pattern name corresponding to the measurement pattern to be executed from among the plurality of measurement patterns corresponding to different conditions for a measurement method.

3. The medical information processing apparatus according to claim 1, wherein the processing circuitry calculates, as the measurement index, a distance between adjacent anatomical landmarks of the extracted anatomical landmarks based on the measurement pattern corresponding to the selected measurement pattern name.

4. The medical information processing apparatus according to claim 1, wherein the processing circuitry
calculates a differential value between the measurement index and a past measurement result that represents the measurement index that has been calculated in a past and that corresponds to the measurement pattern name included in supplementary information of the medical image, and
causes the display apparatus to display the differential value and the measurement result.

5. The medical information processing apparatus according to claim 4, wherein the processing circuitry causes the display apparatus to display the differential value in an emphasized manner if the differential value exceeds a threshold that is determined in advance.

6. The medical information processing apparatus according to claim 1, wherein the processing circuitry records the calculated measurement index as supplementary information of the medical image.

7. The medical information processing apparatus according to claim 6, wherein the processing circuitry outputs the medical image for which the supplementary information is recorded.

8. The medical information processing apparatus according to claim 1, wherein the processing circuitry inputs the medical image into a trained landmark extraction model that is generated by machine learning based on (i) inputs of at least one training medical image data that is input-side teacher data and (ii) coordinate information and a label of each of anatomical landmarks in the training medical image that is output-side teacher data, wherein the trained landmark extraction model outputs a plurality of anatomical landmarks based on the input of the medical image data and acquires the coordinate information on anatomical landmarks among the plurality of anatomical landmarks which correspond to the two or more anatomical landmarks identified based on the selected measurement pattern name and measurement pattern information.

\* \* \* \* \*